(12) United States Patent
Sasaki

(10) Patent No.: US 11,462,359 B2
(45) Date of Patent: Oct. 4, 2022

(54) MULTILAYER CERAMIC CAPACITOR

(71) Applicant: Murata Manufacturing Co., Ltd., Nagaokakyo (JP)

(72) Inventor: Tomohiro Sasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 426 days.

(21) Appl. No.: 16/676,524

(22) Filed: Nov. 7, 2019

(65) Prior Publication Data

US 2020/0152384 A1    May 14, 2020

(30) Foreign Application Priority Data

Nov. 8, 2018 (JP) .............................. JP2018-210870

(51) Int. Cl.
*H01G 4/232* (2006.01)
*H01G 4/12* (2006.01)
*H01G 4/012* (2006.01)
*H01G 4/30* (2006.01)

(52) U.S. Cl.
CPC ............ *H01G 4/232* (2013.01); *H01G 4/012* (2013.01); *H01G 4/1272* (2013.01); *H01G 4/30* (2013.01)

(58) Field of Classification Search
CPC .......... H01G 4/005; H01G 4/012; H01G 4/12; H01G 4/1272; H01G 4/224; H01G 4/232; H01G 4/30
See application file for complete search history.

(56) References Cited

U.S. PATENT DOCUMENTS

| 6,038,121 A | 3/2000 | Naito et al. |
| 2012/0250218 A1 | 10/2012 | Togashi et al. |
| 2016/0049241 A1 | 2/2016 | Uno et al. |

(Continued)

FOREIGN PATENT DOCUMENTS

| JP | 2000-058376 A | 2/2000 |
| JP | 2000-114096 A | 4/2000 |

(Continued)

OTHER PUBLICATIONS

Official Communication issued in corresponding Japanese Patent Application No. 2018-210870, dated Jun. 22, 2021.

(Continued)

*Primary Examiner* — Nathan Milakovich
(74) *Attorney, Agent, or Firm* — Keating & Bennett, LLP

(57) ABSTRACT

A multilayer ceramic capacitor includes a multilayer body including dielectric layers and inner electrodes stacked in an alternating manner, and first, second, third, and fourth outer electrodes provided on a surface of the multilayer body. An effective portion includes a capacitance generating portion in which first and second inner electrodes face each other to generate an electrostatic capacitance, a first successive stacking portion in which first inner electrodes are successively stacked, and a second successive stacking portion in which second inner electrodes are successively stacked. The following relational expressions (1) and (2) are satisfied. (1) about 0.168≤Total thickness of inner electrodes/Dimension of multilayer body in stacking direction. (2) about 0.19≤Total number of first and second inner electrodes opposing each other with dielectric layers interposed therebetween/Total number of inner electrodes≤about 0.48.

14 Claims, 9 Drawing Sheets

(56) References Cited

U.S. PATENT DOCUMENTS

2016/0163455 A1* 6/2016 Iwama .................. H01G 4/012
                   361/301.4
2017/0229244 A1  8/2017 Nakazawa et al.

FOREIGN PATENT DOCUMENTS

| | | | |
|---|---|---|---|
| JP | 2001-155962 | A | 6/2001 |
| JP | 2012-033621 | A | 2/2012 |
| JP | 2012-039146 | A | 2/2012 |
| JP | 2012-221993 | A | 11/2012 |
| JP | 2014-183241 | A | 9/2014 |
| JP | 2014183241 | A * | 9/2014 |
| JP | 2014-241452 | A | 12/2014 |
| JP | 2016-127262 | A | 7/2016 |
| JP | 2017-143129 | A | 8/2017 |

OTHER PUBLICATIONS

Official Communication issued in corresponding Korean Patent Application No. 10-2019-0135058, dated Jan. 22, 2021.

\* cited by examiner

MULTILAYER CERAMIC CAPACITOR

CROSS REFERENCE TO RELATED APPLICATIONS

This application claims the benefit of priority to Japanese Patent Application No. 2018-210870 filed on Nov. 8, 2018. The entire contents of this application are hereby incorporated herein by reference.

BACKGROUND OF THE INVENTION

1. Field of the Invention

The present invention relates to a multilayer ceramic capacitor.

2. Description of the Related Art

As an example of multilayer ceramic capacitors, Japanese Unexamined Patent Application Publication No. 2000-58376 discloses a feedthrough capacitor having a general structure. The ceramic capacitor described in Japanese Unexamined Patent Application Publication No. 2000-58376 is a ceramic capacitor including a ceramic base body, a plurality of first inner electrodes, and a plurality of second inner electrodes. The ceramic base body is formed of a dielectric ceramic material. When the length direction X, the width direction Y, and the thickness direction Z are assumed for the ceramic base body, the plurality of first inner electrodes are buried in the ceramic base body at intervals in the thickness direction Z and are extended such that the ends of each of the plurality of first inner electrodes in the length direction X are exposed at the respective end surfaces of the ceramic base body in the length direction X. The plurality of second inner electrodes are buried in the ceramic base body at intervals such that the plurality of first inner electrodes and the plurality of second inner electrodes are arranged in an alternating manner, and are extended such that the ends of each of the plurality of second inner electrodes in the width direction Y are exposed at the respective end surfaces of the ceramic base body in the width direction Y.

In order to reduce the capacitance of such a feedthrough capacitor described in Japanese Unexamined Patent Application No. 2000-58376, the number of stacked inner electrodes needs to be decreased.

However, as the number of inner electrodes decreases, the direct-current resistance (Rdc) of the inner electrodes increases. As the direct-current resistance increases, the amount of heat generated in the capacitor increases. In order to suppress this increase, the rated current needs to be decreased. Further, when the number of inner electrodes decreases, another issue arises in that the mechanical strength of the capacitor is reduced.

SUMMARY OF THE INVENTION

Preferred embodiments of the present invention provide multilayer ceramic capacitors in each of which a decline in the mechanical strength can be reduced or prevented while an increase in the direct-current resistance is reduced or prevented even if the capacitance is reduced.

A multilayer ceramic capacitor according to a preferred embodiment of the present invention includes a multilayer body that includes a plurality of dielectric layers and a plurality of inner electrodes stacked in an alternating manner and that includes a first main surface and a second main surface opposite to each other in a stacking direction, a first end surface and a second end surface opposite to each other in a length direction orthogonal or substantially orthogonal to the stacking direction, and a first side surface and a second side surface opposite to each other in a width direction orthogonal or substantially orthogonal to the stacking direction and the width direction, and a first outer electrode, a second outer electrode, a third outer electrode, and a fourth outer electrode that are provided on a surface of the multilayer body. The plurality of inner electrodes include first inner electrodes electrically connected to the first outer electrode and the second outer electrode and second inner electrodes electrically connected to the third outer electrode and the fourth outer electrode. The multilayer body includes an effective portion located between an inner electrode closest to the first main surface among the inner electrodes and an inner electrode closest to the second main surface among the inner electrodes, a first outer layer portion located closer to the first main surface than the effective portion is, and a second outer layer portion located closer to the second main surface than the effective portion is. The effective portion includes a capacitance generating portion in which a first inner electrode among the first inner electrodes and a second inner electrode among the second inner electrodes oppose each other to generate an electrostatic capacitance, a first successive stacking portion in which the first inner electrodes are successively stacked, and a second successive stacking portion in which the second inner electrodes are successively stacked. The following expressions (1) and (2) are satisfied.

$$\text{About } 0.168 \leq \text{Total thickness of inner electrodes}/\text{Dimension of multilayer body in stacking direction} \quad (1).$$

$$\text{About } 0.19 \leq \text{Total number of first inner electrodes and second inner electrodes opposing each other with dielectric layers interposed therebetween}/\text{Total number of inner electrodes} \leq \text{About } 0.48 \quad (2).$$

According to preferred embodiments of the present invention, it is possible to provide multilayer ceramic capacitors in each of which a decline in the mechanical strength can be reduced or prevented while an increase in the direct-current resistance is reduced or prevented even if the capacitance is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic capacitors according to preferred embodiments of the present invention will be described in detail with reference to the drawings.

However, the present invention is not limited to configurations described below and can be changed and applied as appropriate without departing from the spirit of the present invention. Note that a combination of two or more preferable configurations described below is also within the scope of the present invention.

Preferred embodiments described below are illustrative, and configurations described in different preferred embodiments can be partially exchanged or combined, as a matter of course. In the second and subsequent preferred embodiments, descriptions of matters common to the first preferred embodiment will be omitted, and only differences will be described. Specifically, similar advantageous effects produced by similar configurations are not described in respective preferred embodiments.

First Preferred Embodiment

Figure 1:
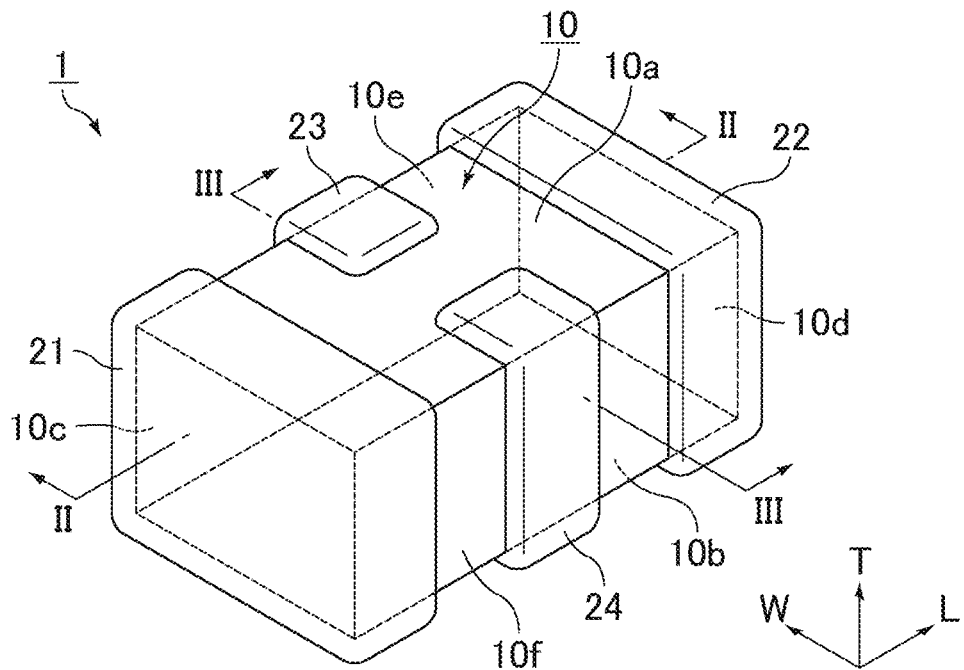
FIG. 1 is a schematic perspective view of an example of a multilayer ceramic capacitor according to a first preferred embodiment of the present invention.
Figure 2:
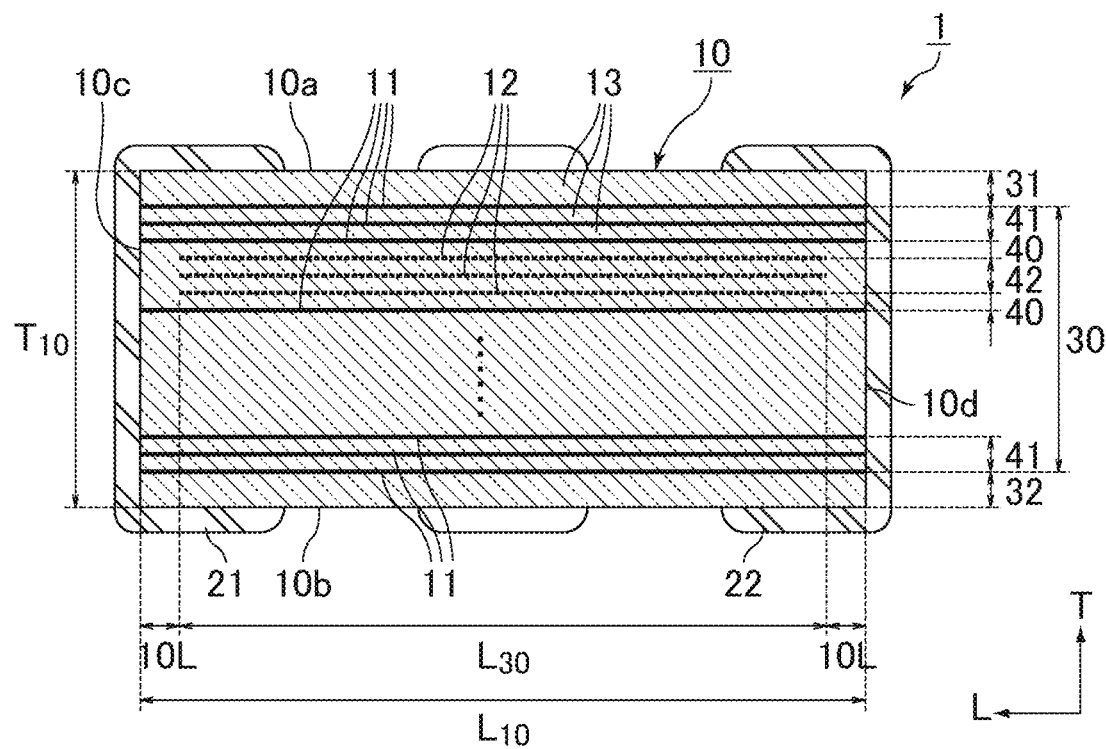
FIG. 2 is a cross-sectional view of the multilayer ceramic capacitor illustrated in FIG. 1 taken along line II-II.
Figure 3:
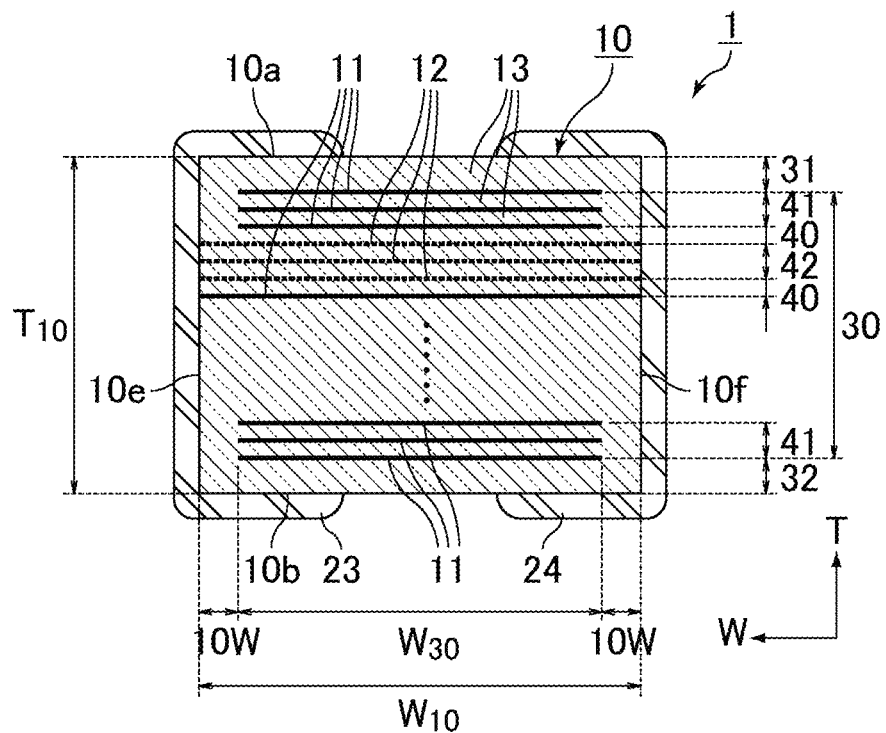
FIG. 3 is a cross-sectional view of the multilayer ceramic capacitor illustrated in FIG. 1 taken along line III-III.

FIG. 1 is a schematic perspective view of an example of a multilayer ceramic capacitor according to a first preferred embodiment of the present invention. FIG. 2 is a cross-sectional view of the multilayer ceramic capacitor illustrated in FIG. 1 taken along line II-II. FIG. 3 is a cross-sectional view of the multilayer ceramic capacitor illustrated in FIG. 1 taken along line III-III.

The stacking direction, the length direction, and the width direction of the multilayer ceramic capacitor and a multilayer body are herein defined as directions indicated by T, L, and W respectively in FIG. 1. Here, the stacking direction (T direction), the length direction (L direction), and the width direction (W direction) are orthogonal or substantially orthogonal to one another. The stacking direction (T direction) is a direction in which a plurality of dielectric layers 13, a plurality of first inner electrodes 11, and a plurality of second inner electrodes 12 are stacked.

FIG. 1, FIG. 2, and FIG. 3 illustrate a multilayer ceramic capacitor 1, which is a three-terminal multilayer ceramic capacitor. As illustrated in FIG. 1, FIG. 2, and FIG. 3, the multilayer ceramic capacitor 1 includes a multilayer body 10 preferably having, for example, a rectangular parallelepiped form or a substantially rectangular parallelepiped form.

The multilayer body 10 includes the plurality of dielectric layers 13 and the plurality of first inner electrodes and second inner electrodes 12, which are stacked in an alternating manner.

The multilayer body 10 includes a first main surface 10a and a second main surface 10b opposite to each other in the stacking direction (T direction), a first end surface 10c and a second end surface 10d opposite to each other in the length direction (L direction) orthogonal or substantially orthogonal to the stacking direction (T direction), and a first side surface 10e and a second side surface 10f opposite to each other in the width direction (W direction) orthogonal or substantially orthogonal to the stacking direction (T direction) and the length direction (L direction).

A cross section of the multilayer ceramic capacitor 1 or the multilayer body 10 orthogonal or substantially orthogonal to the first end surface 10c and the second end surface 10d and parallel or substantially parallel to the stacking direction (T direction) is herein called an LT cross section. A cross section of the multilayer ceramic capacitor 1 or the multilayer body 10 orthogonal or substantially orthogonal to the first side surface 10e and the second side surface 10f and parallel or substantially parallel to the stacking direction (T direction) is herein called a WT cross section. A cross section of the multilayer ceramic capacitor 1 or the multilayer body 10 orthogonal or substantially orthogonal to the first end surface 10c, the second end surface 10d, the first side surface 10e, and the second side surface 10f and orthogonal or substantially orthogonal to the stacking direction (T direction) is herein called an LW cross section. Accordingly, FIG. 2 illustrates an LT cross section of the multilayer ceramic capacitor 1, and FIG. 3 illustrates a WT cross section of the multilayer ceramic capacitor 1.

The multilayer body 10 preferably includes rounded corner portions and rounded edge line portions. Each corner portion is a portion in which three surfaces of the multilayer body 10 meet, and each edge line portion is a portion in which two surfaces of the multilayer body 10 meet.

In the multilayer ceramic capacitor 1 illustrated in FIG. 1, the dimension of the multilayer body 10 in the length direction (L direction) is larger than the dimension thereof in the width direction (W direction). However, the dimension of the multilayer body 10 in the length direction may be smaller than the dimension thereof in the width direction or may be equal or substantially equal to the dimension thereof in the width direction.

The dielectric layers 13 are made of a dielectric material. As the dielectric material, for example, dielectric ceramic including barium titanate, calcium titanate, strontium titanate, calcium zirconate, or the like as a main component can preferably be used. In a case where the above-described dielectric material is included as a main component, a sub-component, such as a Mn compound, a Fe compound, a Cr compound, a Co compound, or a Ni compound, for example, having a content lower than that of the main component may be added and used in accordance with desired characteristics of the multilayer ceramic capacitor 1.

The average thickness of the dielectric layers 13 each sandwiched between the inner electrodes is preferably about 0.6 µm or more and about 6 µm or less, for example.

If the dielectric layers 13 are too thin, reliability significantly decreases. On the other hand, if the dielectric layers 13 are too thick, it is difficult to obtain an electrostatic capacitance.

On the first end surface 10c of the multilayer body 10, a first outer electrode 21, which is a first-end-surface outer electrode, is disposed. The first outer electrode 21 is preferably disposed so as to extend from the first end surface 10c of the multilayer body 10 to cover a portion of the first main surface 10a, a portion of the second main surface 10b, a portion of the first side surface 10e, and a portion of the second side surface 10f.

On the second end surface 10d of the multilayer body 10, a second outer electrode 22, which is a second-end-surface outer electrode, is disposed. The second outer electrode 22 is preferably disposed so as to extend from the second end surface 10d of the multilayer body 10 to cover a portion of the first main surface 10a, a portion of the second main surface 10b, a portion of the first side surface 10e, and a portion of the second side surface 10f.

On the first side surface 10e of the multilayer body 10, a third outer electrode 23, which is a first-side-surface outer electrode, is disposed. The third outer electrode 23 is disposed so as to extend from the first side surface 10e to cover a portion of the first main surface 10a and a portion of the second main surface 10b. Note that the third outer electrode 23 may be disposed only on the first side surface 10e.

On the second side surface 10f of the multilayer body 10, a fourth outer electrode 24, which is a second-side-surface outer electrode, is disposed. The fourth outer electrode 24 is disposed so as to extend from the second side surface 10f to cover a portion of the first main surface 10a and a portion of the second main surface 10b. Note that the fourth outer electrode 24 may be disposed only on the second side surface 10f.

The third outer electrode 23 may extend from the first side surface 10e to the fourth outer electrode 24 along the first main surface 10a, and the third outer electrode 23 may further extend from the first side surface 10e to the fourth outer electrode 24 along the second main surface 10b. Consequently, the third outer electrode 23 and the fourth outer electrode 24 may be electrically connected to each other. Further, the third outer electrode 23 and the fourth outer electrode 24 are preferably disposed so as to wrap around the multilayer body 10.

The above-described outer electrodes each preferably include a base electrode layer on the surface of the multilayer body 10 and a plated layer to cover the base electrode layer in this order from the multilayer body side.

The base electrode layer is preferably made of, for example, at least one selected from among a baked electrode layer, a resin electrode layer, a thin-film electrode layer, and the like.

The baked electrode layer includes metal and glass. As the metal of the baked electrode layer, for example, at least one selected from among Cu, Ni, Ag, Pd, an Ag—Pd alloy, Au, and the like can preferably be used. As the glass of the baked electrode layer, for example, glass containing B, Si, Ba, Mg, Al, Li, or the like can preferably be used.

The baked electrode layer may include a plurality of baked electrode layers.

The baked electrode layer is preferably a layer formed by applying, to the multilayer body 10, and baking a conductive paste containing metal and glass. The baked electrode layer may be fired together with the multilayer body 10 or may be baked after the multilayer body 10 has been fired. In a case of firing the baked electrode layer together with the multilayer body 10 to form the baked electrode layer, the baked electrode layer preferably includes a metal and a ceramic. The ceramic is more preferably a material the same as the dielectric ceramic used in the dielectric layers 13.

In a case where the base electrode layer is the baked electrode layer, the thickness of the baked electrode layer is preferably, for example, about 20 µm or more and about 50 µm or less in the thickest portion.

As the material of the plated layer, for example, at least one selected from among Cu, Ni, Ag, Pd, an Ag—Pd alloy, Au, Sn, and the like is preferably used.

The plated layer may be defined by a plurality of layers. The plated layer preferably includes a two-layer structure made of, for example, a Ni-plated layer and a Sn-plated layer. With a Ni-plated layer, it is possible to prevent the base electrode layer from being eroded by solder used when the multilayer ceramic capacitor 1 is mounted. With a Sn-plated layer, it is possible to improve solder wettability at the time when the multilayer ceramic capacitor 1 is mounted and to facilitate mounting of the multilayer ceramic capacitor 1.

The average thickness of the Ni-plated layer is preferably, for example, about 1 µm or more and about 6 µm or less. The average thickness of the Sn-plated layer is preferably, for example, about 1.5 µm or more and about 6 µm or less.

As illustrated in FIG. 2 and FIG. 3, the multilayer body 10 preferably includes the plurality of first inner electrodes 11 and the plurality of second inner electrodes 12.

In FIG. 2 and FIG. 3, the first inner electrodes 11 are represented by solid lines and the second inner electrodes 12 are represented by dotted lines to clearly distinguish the first inner electrodes 11 and the second inner electrodes 12 from each other.

The multilayer body 10 includes an effective portion 30, a first outer layer portion 31, and a second outer layer portion 32. The effective portion 30 is a region located between the inner electrode closest to the first main surface 10a (the first inner electrode 11 in FIG. 2 and FIG. 3) and the inner electrode closest to the second main surface 10b (the first inner electrode 11 in FIG. 2 and FIG. 3). The first outer layer portion 31 is a region located closer to the first main surface 10a than the effective portion 30 is. The second outer layer portion 32 is a region located closer to the second main surface 10b than the effective portion 30 is.

The effective portion 30 includes a capacitance generating portion 40 in which the first inner electrode 11 and the second inner electrode 12 oppose each other to generate an electrostatic capacitance, a first successive stacking portion 41 in which the first inner electrodes 11 are successively stacked, and a second successive stacking portion 42 in which the second inner electrodes 12 are successively stacked.

In the multilayer ceramic capacitor 1, in the first successive stacking portion 41, the first inner electrode 11 for which the other first inner electrodes 11 are located on the respective sides thereof in the stacking direction (T direction) does not substantially contribute to generating an electrostatic capacitance. Similarly, in the second successive stacking portion 42, the second inner electrode 12 for which the other second inner electrodes 12 are located on the respective sides thereof in the stacking direction (T direction) does not substantially contribute to generating an electrostatic capacitance. Therefore, when the first successive stacking portion 41 and the second successive stacking portion 42 are provided, the electrostatic capacitance of the multilayer ceramic capacitor 1 can be reduced without decreasing the number of inner electrodes. The number of inner electrodes is not excessively small, and therefore, an increase in the direct-current resistance can be reduced or prevented, and a decline in the mechanical strength can be reduced or prevented.

Further, the multilayer ceramic capacitor 1 is characterized in that the following relational expressions (1) and (2) are satisfied:

$$\text{About } 0.168 \leq \text{Total thickness of inner electrodes/Dimension of multilayer body in stacking direction} \quad (1)$$

$$\text{About } 0.19 \leq \text{Total number of first inner electrodes and second inner electrodes opposing each other with dielectric layers interposed therebetween/Total number of inner electrodes} \leq \text{About } 0.48 \quad (2).$$

When the above relational expressions (1) and (2) are satisfied, a decline in the mechanical strength can be prevented while an increase in the direct-current resistance is reduced or prevented even if the capacitance is reduced.

The effective portion 30 preferably includes at least one capacitance generating portion 40, at least one first successive stacking portion 41, and at least one second successive stacking portion 42. The arrangement of the capacitance generating portion 40, the first successive stacking portion 41, and the second successive stacking portion 42 in the effective portion 30 is not specifically limited.

In the capacitance generating portion 40, three or more first inner electrodes 11 and three or more second inner electrodes 12 may preferably be stacked in an alternating manner.

In the first successive stacking portion 41, preferably, three or more first inner electrodes 11 are stacked. In a case where the effective portion 30 includes a plurality of first successive stacking portions 41, the numbers of the first inner electrodes 11 in the respective first successive stacking portions 41 may be the same or may be different.

In the second successive stacking portion 42, preferably, three or more second inner electrodes 12 are stacked. In a case where the effective portion 30 includes a plurality of second successive stacking portions 42, the numbers of the second inner electrodes 12 in the respective second successive stacking portions 42 may be the same or may be different.

The above-described inner electrodes can be made from a suitable conductive material. The inner electrodes preferably include, for example, metal, such as Ni, Cu, Ag, Pd, or Au, or an alloy, such as a Ag—Pd alloy, including one type of metal among the above-listed types of metal. The inner electrodes may further include dielectric particles having the same composition as that of the ceramic contained in the dielectric layers.

The average total thickness of the inner electrodes is preferably, for example, about 0.7 µm or more and about 1.5 µm or less.

The total number of inner electrodes is preferably about 50 or more and about 200 or less and may be about 100 or less.

In the multilayer ceramic capacitor according to the present preferred embodiment, even in a case where the number of inner electrodes is small, a decline in the mechanical strength can be prevented.

Although the number of the first inner electrodes 11 in the first successive stacking portion 41 and the number of the second inner electrodes 12 in the second successive stacking portion 42 may be different, the numbers are preferably the same. In a case where the number of the first inner electrodes 11 and the number of the second inner electrodes 12 are the same, a pattern that forms the first inner electrode 11 and a pattern that forms the second inner electrode 12 are printed with a paste in an alternating manner on the same side of ceramic green sheets that form the dielectric layers, and the ceramic green sheets are stacked such that the patterns are shifted from each other, so that the multilayer ceramic capacitor can be manufactured with high efficiency.

Figure 4:
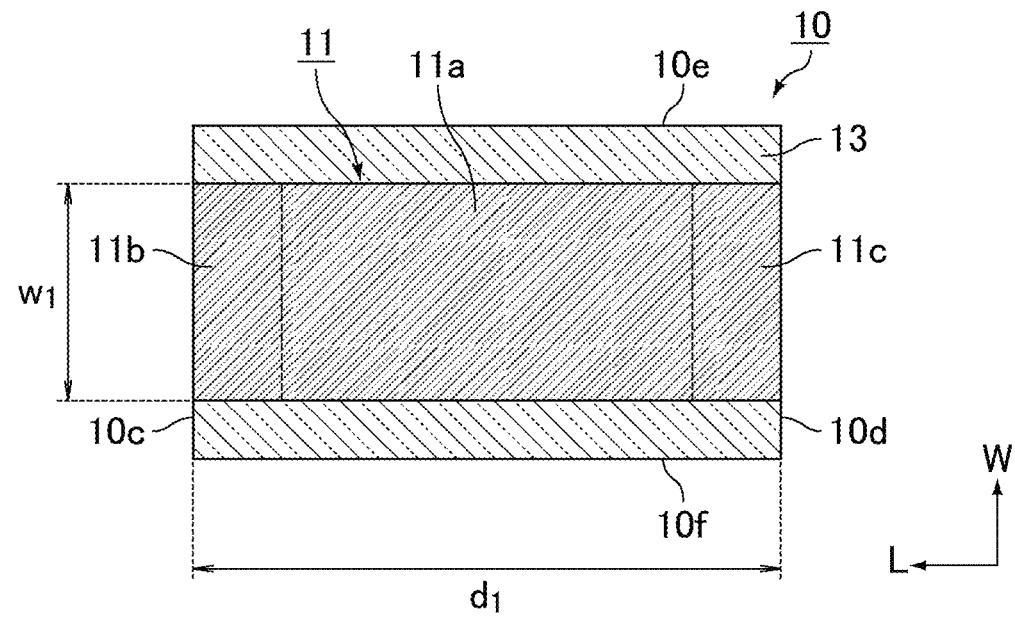
FIG. 4 is a schematic plan view of an example of a first inner electrode in the first preferred embodiment of the present invention.

FIG. 4 is a schematic plan view of an example of the first inner electrode in the first preferred embodiment of the present invention.

As illustrated in FIG. 4, the first inner electrode 11 includes a first facing portion 11a that extends between the first end surface 10c and the second end surface 10d of the multilayer body 10 and corresponds to a center portion thereof, a first extended portion 11b that is extended to the first end surface 10c so as to be electrically connected to the first outer electrode 21, and a second extended portion 11c that is extended to the second end surface 10d so as to be electrically connected to the second outer electrode 22. Consequently, as illustrated in FIG. 2, the first inner electrodes 11 are exposed at the first end surface 10c of the multilayer body 10 and connected to the first outer electrode 21, and are exposed at the second end surface 10d of the multilayer body 10 and connected to the second outer electrode 22.

Figure 5:
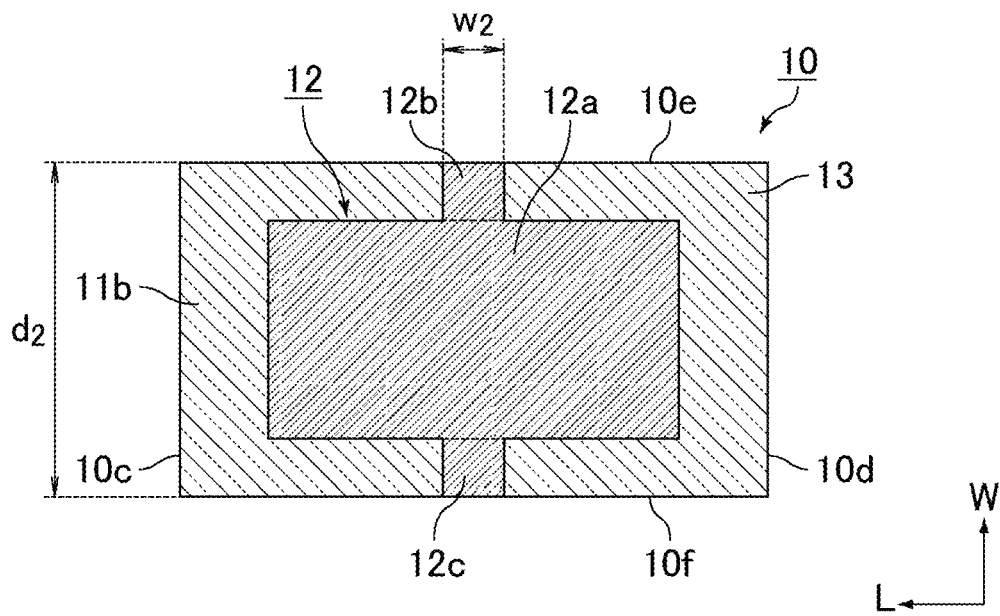
FIG. 5 is a schematic plan view of an example of a second inner electrode in the first preferred embodiment of the present invention.

FIG. 5 is a schematic plan view of an example of the second inner electrode 12 in the first preferred embodiment of the present invention.

As illustrated in FIG. 5, the second inner electrode 12 includes a second facing portion 12a that extends between the first side surface 10e and the second side surface 10f of the multilayer body 10 and corresponds to a center portion thereof, a third extended portion 12b that is extended to the first side surface 10e so as to be electrically connected to the third outer electrode 23, and a fourth extended portion 12c that is extended to the second side surface 10f so as to be electrically connected to the fourth outer electrode 24. Consequently, as illustrated in FIG. 3, the second inner electrodes 12 are exposed at the first side surface 10e of the multilayer body 10 and electrically connected to the third outer electrode 23, and are exposed at the second side surface 10f of the multilayer body 10 and connected to the fourth outer electrode 24.

As illustrated in FIG. 4 and FIG. 5, the first facing portion 11a of the first inner electrode 11 and the second facing portion 12a of the second inner electrode 12 are preferably located at the same projection position when viewed in the stacking direction.

Although the direct-current resistance Rdc given by the plurality of first inner electrodes 11 and the direct-current resistance Rdc given by the plurality of second inner electrodes 12 are preferably equivalent or almost equivalent to each other, the direct-current resistances Rdc may be different from each other. The total number of the first inner electrodes 11 and the total number of the second inner electrodes 12 may be different.

Even for a multilayer ceramic capacitor in which the outer electrodes on the end surfaces are intended to be used in signaling and the outer electrodes on the side surfaces are intended to be used in grounding in the original design, there may be a case where the outer electrodes on the end surfaces need to be used in grounding and the outer electrodes on the side surfaces need to be used in signaling reversely. At the time of such "reverse use", in a case where the direct-current resistance given by the plurality of first inner electrodes 11 and the direct-current resistance given by the plurality of second inner electrodes 12 are different from each other, the direct-current resistance on a signal path differs from that in a case of the original mounting direction. However, this does not pose a problem if the direct-current resistances at the time of "reverse use" are reduced or prevented to some extent so as to be suitable for practical use.

In a case where the direct-current resistance given by the plurality of first inner electrodes 11 and the direct-current resistance given by the plurality of second inner electrodes 12 are equivalent or almost equivalent to each other, the direct-current resistance on a signal path is less likely to change by "reverse use", and therefore, the flexibility of mount land design increases.

In order to decrease the difference between the direct-current resistance given by the plurality of first inner electrodes 11 and the direct-current resistance given by the plurality of second inner electrodes 12, and preferably, to make the direct-current resistance given by the plurality of first inner electrodes 11 and the direct-current resistance given by the plurality of second inner electrodes 12 be equivalent or almost equivalent to each other, a method of changing at least one of the number of stacked inner electrodes, the thickness of the inner electrodes, the distance between the extended portions, and the width of the extended portions can be employed. For example, as the number of stacked inner electrodes increases, the direct-current resistance decreases. As the thickness of the inner electrodes increases, the direct-current resistance decreases. As the distance between the extended portions decreases, the direct-current resistance decreases. As the width of the extended portions increases, the direct-current resistance decreases. Specifically, the following methods can be employed.

Firstly, in a case where the distance between the extended portions of the first inner electrode 11 (the length indicated by $d_1$ in FIG. 4) is longer than the distance between the extended portions of the second inner electrode 12 (the length indicated by $d_2$ in FIG. 5), that is, in a case where the shortest distance, on the first inner electrode 11, from the position of the first extended portion 11b of the first inner electrodes 11 on the first end surface 10c to the position of the second extended portion 11c on the second end surface 10d is longer than the shortest distance, on the second inner electrode 12, from the position of the third extended portion 12b of the second inner electrode 12 on the first side surface 10e to the position of the fourth extended portion 12c on the second side surface 10f, the width of the extended portions of the first inner electrode 11 (the length indicated by $w_1$ in FIG. 4) is made wider than the width of the extended portions of the second inner electrode 12 (the length indicated by $w_2$ in FIG. 5). When the distance between the extended portions is long, the direct-current resistance increases. However, the resistance can be decreased by making the width of the extended portions wider. Accordingly, the direct-current resistance of the first inner electrodes 11 and the direct-current resistance of the second inner electrodes 12 can be made close to each other.

Secondly, in a case where the width of the third extended portion 12b and the fourth extended portion 12c of the second inner electrode 12 is narrower than the width of the first extended portion 11b and the second extended portion 11c of the first inner electrode 11, the extended portions of the second inner electrode 12 may be made thicker. When the width of the extended portions is narrow, the direct-current resistance increases. However, the resistance can be decreased by making the extended portions thicker. Accordingly, the direct-current resistance of the first inner electrodes 11 and the direct-current resistance of the second inner electrodes 12 can be made close to each other.

Thirdly, the number of stacked inner electrodes including the extended portions narrower in width may be made larger than the number of stacked inner electrodes having the extended portions wider in width. When the width of the extended portions is narrow, the direct-current resistance increases. However, the resistance can be decreased by increasing the number of stacked inner electrodes. Accordingly, the direct-current resistance of the first inner electrodes 11 and the direct-current resistance of the second inner electrodes 12 can be made close to each other.

Fourthly, the number of stacked inner electrodes on which the distance between the extended portions is longer may be made larger than the number of stacked inner electrodes on which the distance between the extended portions is shorter. When the distance between the extended portions is long, the direct-current resistance increases. However, the resistance can be decreased by increasing the number of stacked inner electrodes. Accordingly, the direct-current resistance of the first inner electrodes 11 and the direct-current resistance of the second inner electrodes 12 can be made close to each other.

The multilayer body 10 preferably includes an auxiliary electrode (also called a dummy electrode) that does not substantially contribute to generating an electrostatic capacitance in addition to the first inner electrodes 11 and the second inner electrodes 12.

When the auxiliary electrode is provided, the electrode material is exposed at the outer surface of the multilayer body 10 to a large degree, and therefore, the outer electrodes can be in closer contact.

Figure 6:
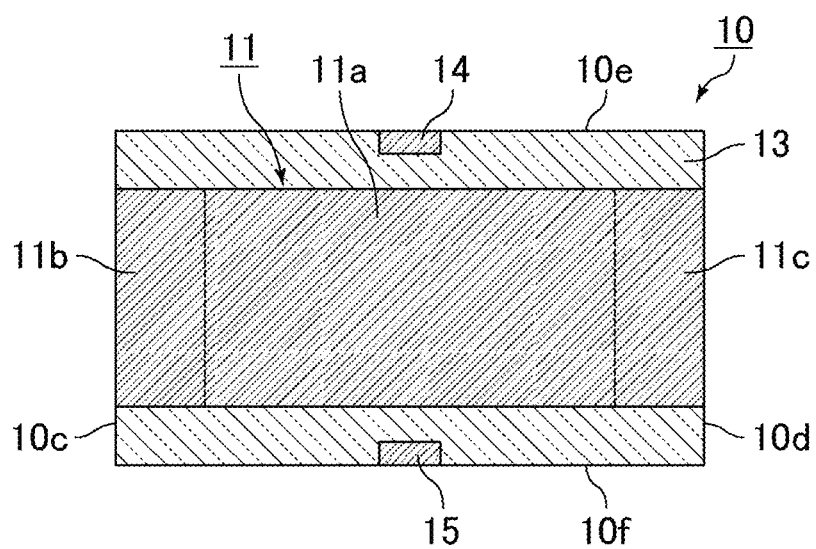
FIG. 6 is a schematic plan view of an example of auxiliary electrodes on the same plane on which the first inner electrode is provided.

FIG. 6 is a schematic plan view of an example of auxiliary electrodes provided on the same plane on which the first inner electrode is formed.

Auxiliary electrodes 14 and 15 are provided on the same plane on which the first inner electrode 11 is provided in a state where the auxiliary electrodes 14 and 15 are isolated from the first inner electrode 11 and respectively extended to the first side surface 10e and the second side surface 10f of the multilayer body 10. Consequently, the auxiliary electrodes 14 and 15 are respectively connected to the third outer electrode 23 and the fourth outer electrode 24. Accordingly, the third outer electrode 23 and the fourth outer electrode 24 can be in closer contact.

Figure 7:
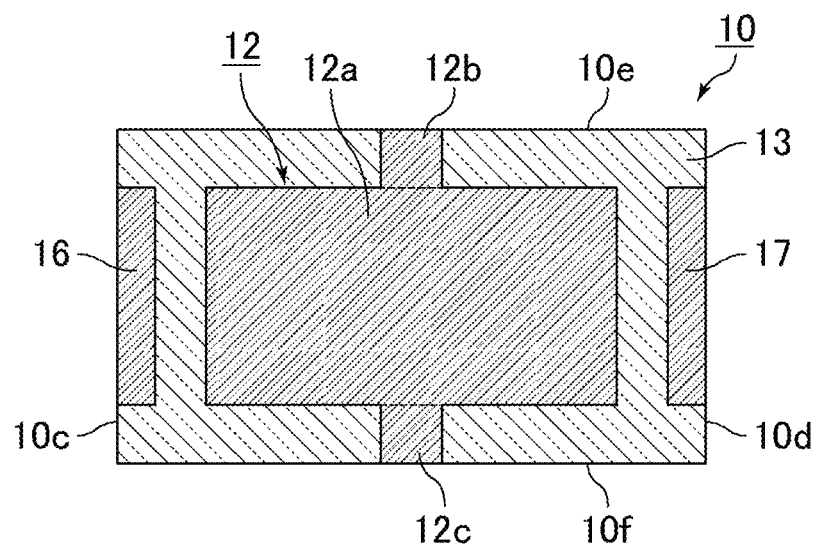
FIG. 7 is a schematic plan view of an example of auxiliary electrodes provided on the same plane on which the second inner electrode is provided.

FIG. 7 is a schematic plan view of an example of auxiliary electrodes provided on the same plane on which the second inner electrode is formed.

Auxiliary electrodes 16 and 17 are provided on the same plane on which the second inner electrode 12 is provided in a state where the auxiliary electrodes 16 and 17 are isolated from the second inner electrode 12 and respectively extended to the first end surface 10c and the second end surface 10d of the multilayer body 10. Consequently, the auxiliary electrodes 16 and 17 are respectively connected to the first outer electrode 21 and the second outer electrode 22. Accordingly, the first outer electrode 21 and the second outer electrode 22 can be in closer contact.

As illustrated in FIG. 2, the multilayer body 10 includes a side portion (hereinafter referred to as an L gap) 10L between one end of the inner electrodes in the length direction (L direction), the inner electrodes opposing each other in the stacking direction (T direction), and the first end surface 10c or the second end surface 10d. Further, as illustrated in FIG. 3, the multilayer body 10 includes a side portion (hereinafter referred to as a W gap) 10W between one end of the inner electrodes in the width direction (W direction), the inner electrodes opposing each other in the stacking direction (T direction), and the first side surface 10e or the second side surface 10f.

The average length of the L gap 10L in the length direction (L direction) is preferably, for example, about 30 μm or more and about 200 μm or less.

The average length of the W gap 10W in the width direction (W direction) is preferably, for example, about 30 μm or more and about 200 μm or less.

The thickness of the first outer layer portion 31 is preferably, for example, about 30 μm or more and about 200 μm or less. Similarly, the thickness of the second outer layer portion 32 is preferably, for example, about 30 μm or more and about 200 μm or less.

When the first outer layer portion 31 and the second outer layer portion 32 are too thin, a structural defect, such as a delamination of the outer layers, is likely to occur. On the other hand, when the first outer layer portion 31 and the second outer layer portion 32 are too thick, equivalent series inductance (ESL) characteristics, which are characteristics of three-terminal capacitors, are likely to be compromised.

The thickness of the first outer layer portion 31 and that of the second outer layer portion 32 may preferably be, for example, about 75 μm or more or about 100 μm or more.

In the multilayer ceramic capacitor of the present preferred embodiment, a decline in the mechanical strength can be prevented also with the thick outer layer portions.

In FIG. 2, the ratio ($L_{30}/L_{10}$) of the dimension of the effective portion 30 in the length direction (L direction) indicated by $L_{30}$ relative to the dimension of the multilayer body in the length direction (L direction) indicated by $L_{10}$ is preferably, for example, about 0.7 or more and less than about 1.

In this case, the ratio of metal that occupies the multilayer body 10 is not excessively low, and therefore, a decline in the mechanical strength can be further prevented.

In FIG. 3, the ratio ($W_{30}/W_{10}$) of the dimension of the effective portion 30 in the width direction (W direction) indicated by $W_{30}$ relative to the dimension of the multilayer body 10 in the width direction (W direction) indicated by $W_{10}$ is preferably, for example, about 0.7 or more and less than about 1.

In this case, the ratio of metal that occupies the multilayer body 10 is not excessively low, and therefore, a decline in the mechanical strength can be further prevented.

As described above, at least one of the following relational expressions (3) and (4) is preferably satisfied:

About 0.7≤Dimension of effective portion in length direction/Dimension of multilayer body in length direction<About 1    (3)

About 0.7≤Dimension of effective portion in width direction/Dimension of multilayer body in width direction<About 1    (4).

The dimension $L_{30}$ of the effective portion 30 in the length direction and the dimension $W_{30}$ thereof in the width direction can be measured by grinding the cross sections of the multilayer body 10 after firing and by using a microscope.

The dimension $T_{10}$ of the multilayer body 10 in the stacking direction (T direction) is preferably, for example, about 0.2 mm or more and about 2.5 mm or less. The dimension $L_{10}$ of the multilayer body 10 in the length direction (L direction) is preferably, for example, about 1.0 mm or more and about 3.2 mm or less. The dimension $W_{10}$ of the multilayer body 10 in the width direction (W direction) is preferably, for example, about 0.5 mm or more and about 2.5 mm or less.

The multilayer ceramic capacitor according to the first preferred embodiment of the present invention is preferably manufactured as follows. A description is provided below of an example case where the multilayer ceramic capacitor 1 illustrated in FIG. 1 is manufactured in volume.

First, ceramic green sheets used in forming the dielectric layers 13 are prepared. Separately from this, an inner-electrode conductive paste used in forming the first inner electrodes 11 and the second inner electrodes 12 and an outer-electrode conductive paste used in forming the first outer electrode 21, the second outer electrode 22, the third outer electrode 23, and the fourth outer electrode 24 are prepared. The ceramic green sheets, the inner-electrode conductive paste, and the outer-electrode conductive paste contain an organic binder and an organic solvent. As the organic binder and solvent, a known organic binder and a known organic solvent can preferably be used.

On the ceramic green sheets, for example, the inner-electrode conductive paste is applied in a predetermined pattern to form an inner-electrode pattern. The inner-electrode conductive paste can be applied with a known method, such as a screen printing method, for example.

Next, a predetermined number of outer-layer ceramic green sheets on which no inner-electrode pattern is formed are stacked. On top of the outer-layer ceramic green sheets, the ceramic green sheets on which the inner-electrode pattern has been formed is sequentially stacked. On top of the ceramic green sheets on which the inner-electrode pattern has been formed, a predetermined number of outer-layer ceramic green sheets are stacked. Accordingly, a mother multilayer body is manufactured. The mother multilayer body may be pressure-bonded in the stacking direction as necessary preferably by, for example, isostatic pressing.

Thereafter, the mother multilayer body is cut into pieces having a predetermined shape and predetermined dimensions to thus obtain non-fired multilayer bodies 10. At this time, the corner portions and the edge line portions of the multilayer bodies may be rounded by barrel finishing.

The non-fired multilayer bodies 10 are fired. Consequently, the multilayer bodies 10 in which the first inner electrodes 11 and the second inner electrodes 12 are arranged are manufactured. The firing temperature can be set as appropriate in accordance with the ceramic material and the conductive material that are used and, for example, is preferably about 900° C. or higher and about 1300° C. or lower. The ceramic green sheets and the inner-electrode conductive paste are simultaneously fired.

The conductive paste is applied to the first end surface 10c of each of the obtained multilayer bodies 10 and baked so that the base electrode layer of the first outer electrode 21 is formed, and the conductive paste is applied to the second end surface 10d thereof and baked so that the base electrode layer of the second outer electrode 22 is formed. The conductive paste is applied to the first side surface 10e of each of the multilayer bodies 10 and baked so that the base electrode layer of the third outer electrode 23 is formed, and the conductive paste is applied to the second side surface 10f thereof and baked so that the base electrode layer of the fourth outer electrode 24 is formed. The baking temperature is preferably, for example, about 700° C. or higher and about 900° C. or lower.

A plated layer is formed on the surface of the base electrode layer of the first outer electrode 21, and a plated layer is formed on the surface of the base electrode layer of the second outer electrode 22. A plated layer is formed on the surface of the base electrode layer of the third outer electrode 23, and a plated layer is formed on the surface of the base electrode layer of the fourth outer electrode 24.

Accordingly, the multilayer ceramic capacitor 1 illustrated in FIG. 1 is manufactured.

Second Preferred Embodiment

Figure 8:
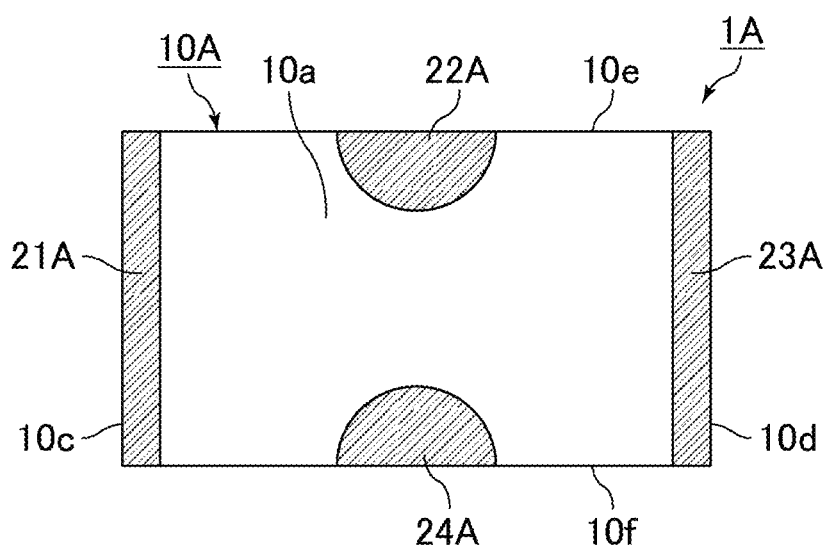
FIG. 8 is a schematic plan view of an example of a multilayer ceramic capacitor according to a second preferred embodiment of the present invention.
Figure 9:
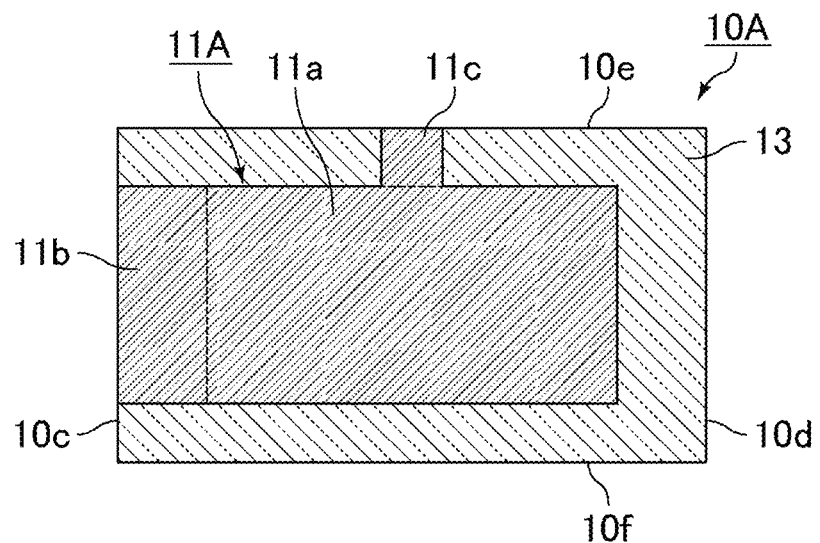
FIG. 9 is a schematic plan view of an example of a first inner electrode in the second preferred embodiment of the present invention.
Figure 10:
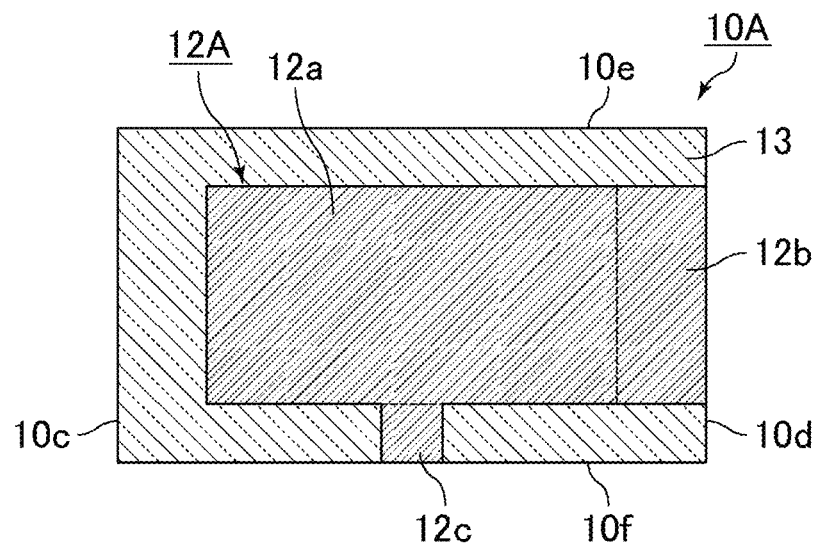
FIG. 10 is a schematic plan view of an example of a second inner electrode in the second preferred embodiment of the present invention.

FIG. 8 is a schematic plan view of an example of a multilayer ceramic capacitor according to a second preferred embodiment of the present invention. FIG. 9 is a schematic plan view of an example of a first inner electrode in the second preferred embodiment of the present invention. FIG. 10 is a schematic plan view of an example of a second inner electrode in the second preferred embodiment of the present invention.

In the multilayer ceramic capacitor according to the second preferred embodiment, first, the positional relationship among the first outer electrode, the second outer electrode, the third outer electrode, and the fourth outer electrode is preferably different from that in the first preferred embodiment. In a multilayer ceramic capacitor 1A illustrated in FIG. 8, a first outer electrode 21A and a fourth outer electrode 24A are respectively disposed on the first end surface 10c and the second side surface 10f of a multilayer body 10A as in the first preferred embodiment. However, a second outer electrode 22A is disposed on the first side surface 10e, and a third outer electrode 23A is disposed on the second end surface 10d.

The first outer electrode 21A, the second outer electrode 22A, the third outer electrode 23A, and the fourth outer electrode 24A are thus disposed. Accordingly, the shape of a first inner electrode 11A and that of a second inner electrode 12A are changed as follows from those in the first preferred embodiment.

As illustrated in FIG. 9, the first inner electrode 11A preferably includes the first facing portion 11a that extends between the first end surface 10c and the first side surface 10e of the multilayer body 10A and corresponds to a center portion thereof, the first extended portion 11b that is extended to the first end surface 10c so as to be electrically connected to the first outer electrode 21A, and the second extended portion 11c that is extended to the first side surface 10e so as to be electrically connected to the second outer electrode 22A.

As illustrated in FIG. 10, the second inner electrode 12A preferably includes the second facing portion 12a that extends between the second end surface 10d and the second side surface 10f of the multilayer body 10A and corresponds to a center portion thereof, the third extended portion 12b that is extended to the second end surface 10d so as to be electrically connected to the third outer electrode 23A, and the fourth extended portion 12c that is extended to the second side surface 10f so as to be electrically connected to the fourth outer electrode 24A.

Third Preferred Embodiment

Figure 11:
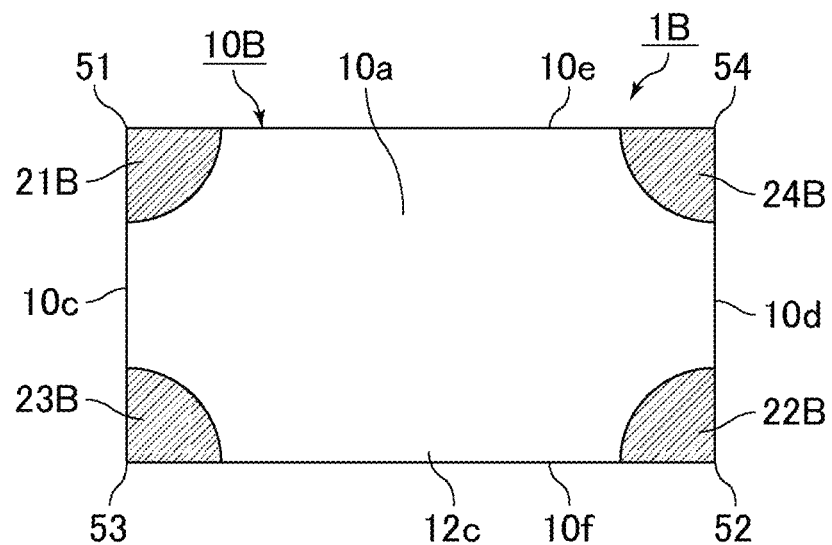
FIG. 11 is a schematic plan view of an example of a multilayer ceramic capacitor according to a third preferred embodiment of the present invention.
Figure 12:
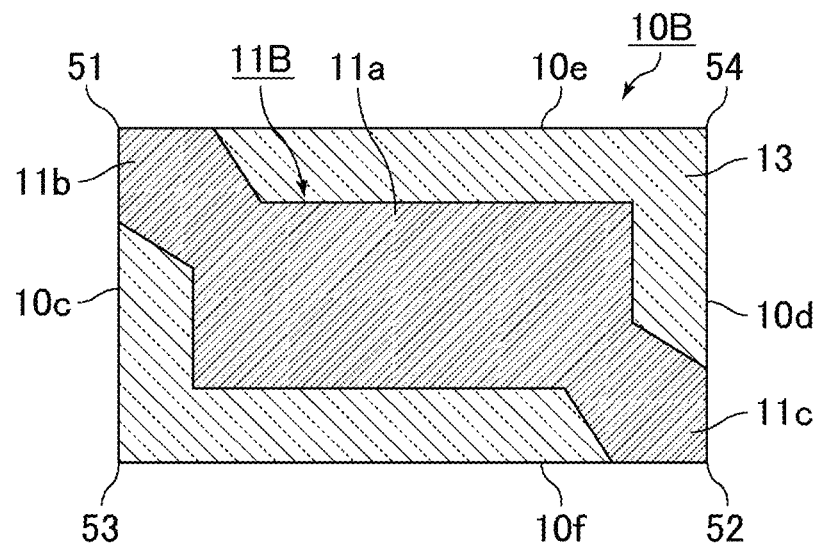
FIG. 12 is a schematic plan view of an example of a first inner electrode in the third preferred embodiment of the present invention.
Figure 13:
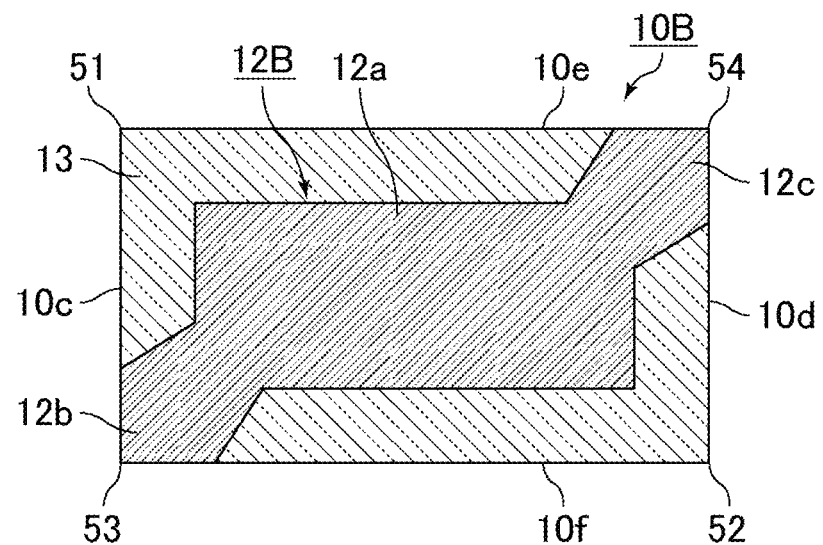
FIG. 13 is a schematic plan view of an example of a second inner electrode in the third preferred embodiment of the present invention.

FIG. 11 is a schematic plan view of an example of a multilayer ceramic capacitor according to a third preferred embodiment of the present invention. FIG. 12 is a schematic plan view of an example of a first inner electrode in the third preferred embodiment of the present invention. FIG. 13 is a schematic plan view of an example of a second inner electrode in the third preferred embodiment of the present invention.

Also in the multilayer ceramic capacitor according to the third preferred embodiment, as in the second preferred embodiment, the positional relationship among the first outer electrode, the second outer electrode, the third outer electrode, and the fourth outer electrode is preferably different from that in the first preferred embodiment. In a multilayer ceramic capacitor 1B illustrated in FIG. 11, a first outer electrode 21B is disposed on a first corner portion 51 at which the first side surface 10e and the first end surface 10c meet, a second outer electrode 22B is disposed on a second corner portion 52 at which the second side surface 10f and the second end surface 10d meet, a third outer electrode 23B is disposed on a third corner portion 53 at which the second side surface 10f and the first end surface 10c meet, and a fourth outer electrode 24B is disposed on a fourth corner portion 54 at which the first side surface 10e and the second end surface 10d meet.

The first outer electrode 21B, the second outer electrode 22B, the third outer electrode 23B, and the fourth outer electrode 24B are thus disposed. Accordingly, the shape of a first inner electrode 11B and that of a second inner electrode 12B are changed as follows from those in the first preferred embodiment.

As illustrated in FIG. 12, the first inner electrode 11B preferably includes the first facing portion 11a that extends between the first corner portion 51 and the second corner portion of a multilayer body 10B in the diagonal direction and corresponds to a center portion thereof, the first extended portion 11b that is extended to the first corner portion 51 so as to be electrically connected to the first outer electrode 21B, and the second extended portion 11c that is extended to the second corner portion 52 so as to be electrically connected to the second outer electrode 22B.

As illustrated in FIG. 13, the second inner electrode 12B preferably includes the second facing portion 12a that extends between the third corner portion 53 and the fourth corner portion of the multilayer body 10B in the diagonal direction and corresponds to a center portion thereof, the third extended portion 12b that is extended to the third corner portion 53 so as to be electrically connected to the third outer electrode 23B, and the fourth extended portion 12c that is extended to the fourth corner portion 54 so as to be electrically connected to the fourth outer electrode 24B.

As described in the second preferred embodiment and the third preferred embodiment, the position of each of the first outer electrode, the second outer electrode, the third outer electrode, and the fourth outer electrode on the outer surface of the multilayer body 10 is not specifically limited.

Fourth Preferred Embodiment

Figure 14:
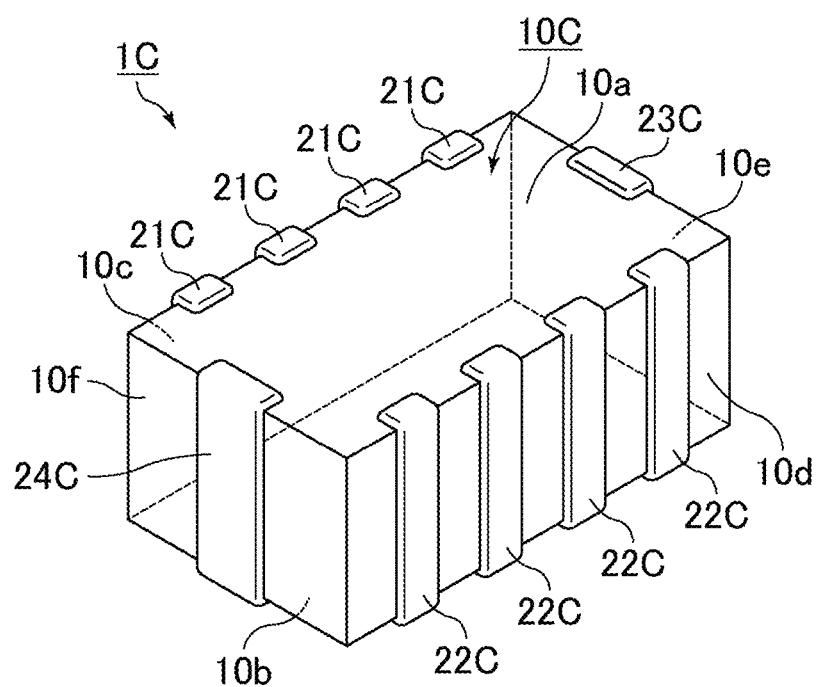
FIG. 14 is a schematic perspective view of an example of a multilayer ceramic capacitor according to a fourth preferred embodiment of the present invention.
Figure 15:
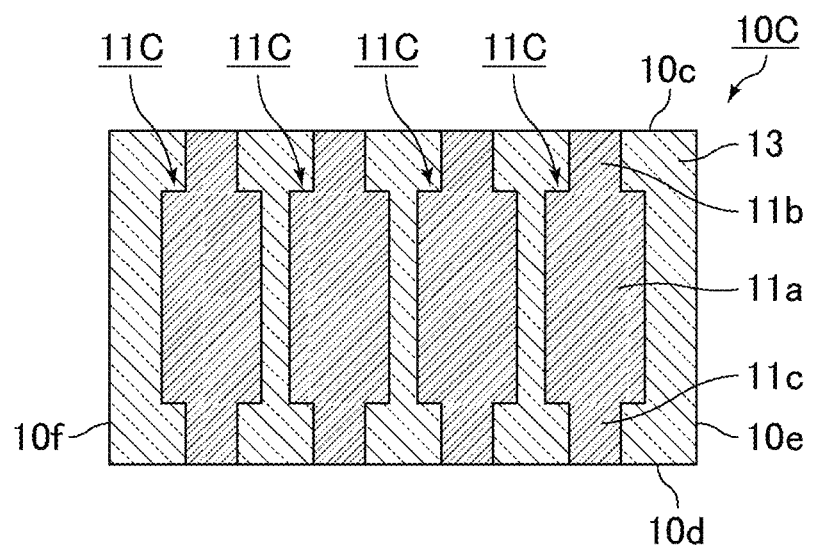
FIG. 15 is a schematic plan view of an example of a first inner electrode in the fourth preferred embodiment of the present invention.
Figure 16:
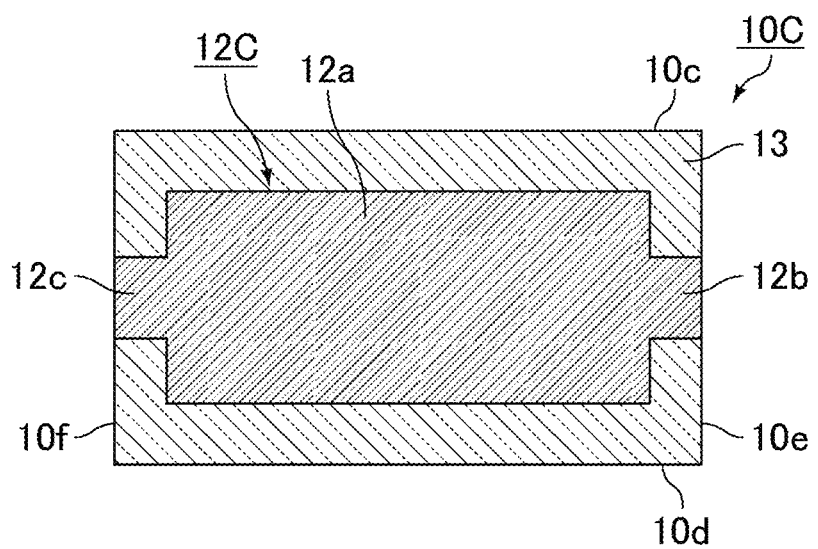
FIG. 16 is a schematic plan view of an example of a second inner electrode in the fourth preferred embodiment of the present invention.

FIG. 14 is a schematic perspective view of an example of a multilayer ceramic capacitor according to a fourth preferred embodiment of the present invention. FIG. 15 is a schematic plan view of an example of a first inner electrode in the fourth preferred embodiment of the present invention. FIG. 16 is a schematic plan view of an example of a second inner electrode in the fourth preferred embodiment of the present invention.

In the multilayer ceramic capacitor according to the fourth preferred embodiment, when the multilayer body is viewed in the planar direction, surfaces that extend in the longitudinal direction are denoted as end surfaces, and surfaces that extend in a direction orthogonal or substantially orthogonal to the end surfaces are denoted as side surfaces.

The multilayer ceramic capacitor according to the fourth preferred embodiment is characterized in that a plurality of first outer electrodes and a plurality of second outer electrodes are provided on the respective end surfaces of the multilayer body. For example, in a multilayer ceramic capacitor 1C illustrated in FIG. 14, four first outer electrodes 21C are provided on the first end surface 10c of a multilayer body 10C, and four second outer electrodes 22C are provided on the second end surface 10d thereof.

Accordingly, as illustrated in FIG. 15, four first inner electrodes 11C are provided side by side. The four first inner electrodes 11C are electrically connected to the four first outer electrodes 21C and the four second outer electrodes 22C respectively.

In the example illustrated in FIG. 14, a third outer electrode 23C and a fourth outer electrode 24C do not cover the entire surface of the first side surface 10e and the second side surface 10f of the multilayer body 10C respectively, but are formed so as to cover only a center portion of the first side surface 10e and the second side surface 10f in the width direction respectively. As illustrated in FIG. 16, the width of the third extended portion 12b and the fourth extended portion 12c of a second inner electrode 12C is narrower than the width of the second facing portion 12a.

Examples

Examples in which the multilayer ceramic capacitor according to preferred embodiments of the present invention is more specifically disclosed will be described below. Note that the present invention is not limited to these examples only.

Multilayer ceramic capacitors according to first to third examples and first to fifth comparative examples having the following configuration were manufactured:
 External dimensions (L×W×T): about 1.7 mm×about 0.9 mm×about 0.7 mm
 Dimensions of multilayer body (L×W×T): about 1.6 mm×about 0.8 mm×about 0.6 mm
 Average thickness of dielectric layers: about 3.4 μm
 Main component of material of dielectric layers: barium titanate
 Average thickness of inner electrodes: about 1.2 μm
 Main component of inner electrodes: Ni
 Structure of outer electrode: Structure including base electrode layer and plated layer
 Base electrode layer: Cu-baked electrode
 Plated layer: Two-layer structure formed of Ni-plated layer and Sn-plated layer
 L gap: about 180 μm
 W gap: about 120 μm
 Thickness of outer layer portion (one side): about 75 μm
Method for Measuring T Dimension of Multilayer Body The T dimensions of ten sample multilayer bodies for each condition were measured, and the average was calculated.

Each sample was positioned upright so as to be perpendicular or substantially perpendicular and was fixed by surrounding the sample with a resin. At this time, a side surface of each sample extending in the length direction (L direction) and the stacking direction (T direction) was exposed. The side surface was ground with a grinder, the grinding was stopped at a depth of one-half of the multilayer body in the width direction (W direction), and an LT cross section was exposed so that the inner electrodes were exposed including their portions connected to the outer electrodes.

The T dimension of the multilayer body was measured at the position of one-half of the LT cross section in the length direction (L direction).

Method for Measuring Thickness of Dielectric Layers and Thickness of Inner Electrodes First, three samples were prepared for each condition, and each sample was positioned upright so as to be perpendicular or substantially perpendicular and was fixed by surrounding the sample with a resin. At this time, a side surface of each sample extending in the width direction (W direction) and the stacking direction (T direction) was exposed. The side surface was ground with a grinder, the grinding was stopped at a depth of one-half of the multilayer body in the length direction (L direction), and the ground surface was exposed. On the ground surface, ion milling was performed to remove sags created by grinding. Accordingly, a WT cross section for observation was obtained.

Figure 17:
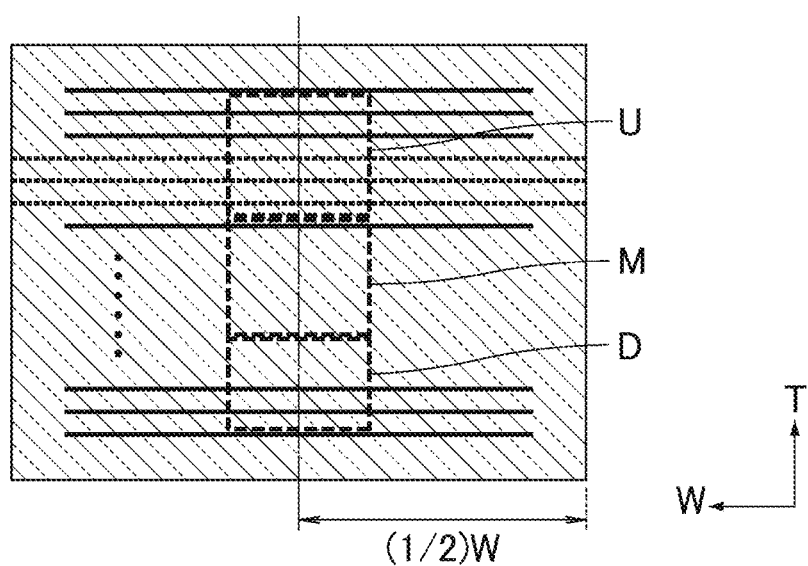
FIG. 17 is a schematic cross-sectional view of an example of a WT cross section of a multilayer body according to a preferred embodiment of the present invention.

FIG. 17 is a schematic cross-sectional view of an example of the WT cross section of the multilayer body.

As illustrated in FIG. 17, at the position of about one-half of the WT cross section in the width direction (W direction), a perpendicular line orthogonal or substantially orthogonal to the inner electrodes was drawn. Next, a region of the sample in which the inner electrodes are stacked was equally divided into three regions in the stacking direction, namely, an upper portion U, a middle portion M, and a lower portion D. Five dielectric layers were selected from a center portion of each region in the stacking direction, and the thickness of each of the dielectric layers on the perpendicular line was measured. Note that, for example, when an inner electrode sandwiched between dielectric layers is chipped on the perpendicular line and the dielectric layers are connected to each other, measurement of the dielectric layers is not possible. Therefore, such dielectric layers were excluded.

Accordingly, the thickness of each of the five dielectric layers in the three regions was measured for each sample, and the average was calculated. Consequently, the average of the thicknesses of the dielectric layers at 45 points (3 samples×3 regions×5 layers) was calculated.

Similarly, the thickness of each of the inner electrodes on the five layers in the three regions was measured for each sample, and the average was calculated. In the examples and comparative examples, the thickness of the first inner electrodes and the thickness of the second inner electrodes are substantially the same. Therefore, the average of the thicknesses of the inner electrodes at 45 points (3 samples×3 regions×5 layers) was calculated. Note that a portion for which measurement was not possible because, for example, an inner electrode was chipped was excluded from measurement.

The thicknesses of the dielectric layers and the thicknesses of the inner electrodes were measured by using a scanning electron microscope.

Table 1 shows the stacking structure of inner electrodes in the multilayer ceramic capacitors according to the first to third examples and the first comparative example.

TABLE 1

|  | First example | Second example | Third example | First comparative example |
|---|---|---|---|---|
| Stacking structure | Inner electrode 1 × 4 | Inner electrode 1 × 5 | Inner electrode 1 × 8 | Inner electrode 1 |
|  | Inner electrode 2 × 4 | Inner electrode 2 × 5 | Inner electrode 2 × 11 | Inner electrode 2 |
|  | Inner electrode 1 × 4 | Inner electrode 1 × 5 | Inner electrode 1 × 8 | Inner electrode 1 |
|  | Inner electrode 2 × 4 | Inner electrode 2 × 5 | Inner electrode 2 × 11 | Inner electrode 2 |
|  | . | . | . | Inner electrode 1 |
|  | . | . | . | Inner electrode 2 |
|  | . | . | . | Inner electrode 1 |
|  | Inner electrode 1 × 4 | Inner electrode 1 × 5 |  | Inner electrode 2 |
|  | Inner electrode 2 × 4 | Inner electrode 2 × 5 | Inner electrode 1 × 8 | Inner electrode 1 |
|  | Inner electrode 1 × 4 | Inner electrode 1 × 5 | Inner electrode 2 × 11 |  |
|  | Inner electrode 2 × 4 | Inner electrode 2 × 5 | Inner electrode 1 × 8 |  |
| Total number | 96 | 90 | 84 | 9 |
| Effective number | 46 | 34 | 16 | 9 |
| Number of elements | 23 | 17 | 8 | 8 |

In Table 1, the first inner electrode is indicated as "inner electrode 1", and the second inner electrode is indicated as "inner electrode 2". The total number of inner electrodes is indicated as "total number", and the total number of the first inner electrodes and the second inner electrodes opposing each other with the dielectric layers interposed therebetween is indicated as "effective number". Table 1 further indicates the total number of elements in a case where the first inner electrode and the second inner electrode opposing each other with the dielectric layer interposed therebetween are counted as one element.

Table 2 shows the total number of inner electrodes, the total number of the first inner electrodes and the second inner electrodes opposing each other with the dielectric layers interposed therebetween (effective number), the total thickness of the inner electrodes, and the dimension of the multilayer body in the stacking direction (T dimension) in the multilayer ceramic capacitors according to the first to third examples and the first to fifth comparative examples.

Further, the value of X, which is the ratio of the total thickness of the inner electrodes relative to the dimension of the multilayer body in the stacking direction, was calculated on the basis of the relational expression (1) described above, and the value of Y, which is the ratio of the effective number relative to the total number of inner electrodes, was calculated on the basis of the relational expression (2) described above. The results are shown in Table 2.

the direct-current resistance Rdc of the second inner electrodes (the total value for all layers) were measured. Twenty samples were prepared for each condition, and the averages were calculated. The results are shown in Table 3.

TABLE 3

|  | First example | Second example | Third example | First comparative example |
|---|---|---|---|---|
| Electrostatic capacitance | 0.1 µF | 0.068 µF | 0.033 µF | 0.033 µF |
| Rdc of first inner electrodes | 6.7 mΩ | 7.1 mΩ | 7.5 mΩ | 70 mΩ |
| Rdc of second inner electrodes | 5.5 mΩ | 5.9 mΩ | 6.0 mΩ | 50 mΩ |

As shown in Table 3, with the existing structure according to, for example, the first comparative example, as the number of inner electrodes decreases in order to attain a low electrostatic capacitance, Rdc of the first inner electrodes and Rdc of the second inner electrodes increase. On the other hand, with the structure in which the inner electrodes are successively stacked according to, for example, the first to third examples, it is confirmed that even in the third

TABLE 2

|  |  | First example | Second example | Third example | Second comparative example | Third comparative example | Fourth comparative example | Fifth comparative example | First comparative example |
|---|---|---|---|---|---|---|---|---|---|
| Inner electrodes | Total number | 96 | 90 | 84 | 84 | 76 | 57 | 31 | 9 |
|  | Effective number | 46 | 34 | 16 | 8 | 76 | 57 | 31 | 9 |
|  | Total thickness (mm) | 0.1152 | 0.108 | 0.1008 | 0.1008 | 0.0912 | 0.0684 | 0.0372 | 0.0108 |
| T dimension of multilayer body (mm) |  | 0.6 | 0.6 | 0.6 | 0.6 | 0.6 | 0.6 | 0.6 | 0.6 |
|  | X | 0.192 | 0.180 | 0.168 | 0.168 | 0.152 | 0.114 | 0.062 | 0.018 |
|  | Y | 0.48 | 0.38 | 0.19 | 0.10 | 1.00 | 1.00 | 1.00 | 1.00 |

First Evaluation

For the multilayer ceramic capacitors according to the first to third examples and the first comparative example, the electrostatic capacitance, the direct-current resistance Rdc of the first inner electrodes (the total value for all layers), and example in which the electrostatic capacitance is lowest (0.033 µF), Rdc of the first inner electrodes and Rdc of the second inner electrodes are equivalent to those in the first example in which the electrostatic capacitance is highest (0.1 µF).

Second Evaluation

For the multilayer ceramic capacitors according to the first to third examples and the first to fifth comparative examples, a flexure test was conducted with the following method.

In the flexure test, ten samples were prepared for each condition, and each sample was mounted on a glass epoxy substrate having a thickness of about 1.6 mm by using solder. To this substrate, pressure was applied from the back side toward the front side in a center portion of the substrate at a pressing speed of about 0.5 mm/sec. by using a pressing tool having a tip portion of a radius of about 1 m, and the substrate was bent by about 2 mm and kept bent for five seconds.

After keeping the substrate bent with the flexure amount of about 2 mm for five seconds, in a case where no crack occurred in the multilayer body, the sample was determined to be non-defective. The occurrence of a crack was checked by fixing the sample by surrounding the sample with a resin, grinding an LT cross section up to a depth of one-half of the multilayer body in the width direction (W direction), and observing the LT section by using a metallurgical microscope.

The results of the flexure test are shown in Table 4. In Table 4, in a case where all of the ten samples were non-defective, the case was determined to be fine, and in a case where at least one of the ten samples was defective, the case was determined to be poor.

TABLE 4

| | First example | Second example | Third example | Second comparative example | Third comparative example | Fourth comparative example | Fifth comparative example | First comparative example |
|---|---|---|---|---|---|---|---|---|
| Crack occurrence ratio | 0/10 | 0/10 | 0/10 | 1/10 | 5/10 | 4/10 | 5/10 | 7/10 |
| Determination | Fine | Fine | Fine | Poor | Poor | Poor | Poor | Poor |

It is confirmed from Table 4 that, with the structure in which the inner electrodes are successively stacked as in the first to third examples, even in the third example in which the electrostatic capacitance is lowest, the total number of inner electrodes is not excessively small, and therefore, a decline in the mechanical strength is prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
   a multilayer body that includes a plurality of dielectric layers and a plurality of inner electrodes stacked in an alternating manner and that includes a first main surface and a second main surface opposite to each other in a stacking direction, a first end surface and a second end surface opposite to each other in a length direction orthogonal or substantially orthogonal to the stacking direction, and a first side surface and a second side surface opposite to each other in a width direction orthogonal or substantially orthogonal to the stacking direction and the width direction; and
   a first outer electrode, a second outer electrode, a third outer electrode, and a fourth outer electrode provided on a surface of the multilayer body; wherein
   a total number of the plurality of inner electrodes is about 50 or more and about 200 or less;
   the plurality of inner electrodes include first inner electrodes electrically connected to the first outer electrode and the second outer electrode and second inner electrodes electrically connected to the third outer electrode and the fourth outer electrode;
   the multilayer body includes an effective portion located between an inner electrode closest to the first main surface among the plurality of inner electrodes and an inner electrode closest to the second main surface among the plurality of inner electrodes, a first outer layer portion located closer to the first main surface than the effective portion is, and a second outer layer portion located closer to the second main surface than the effective portion is;
   the effective portion includes a capacitance generating portion in which a first inner electrode among the first inner electrodes and a second inner electrode among the second inner electrodes face each other to generate an electrostatic capacitance, a first successive stacking portion in which the first inner electrodes are successively stacked, and a second successive stacking portion in which the second inner electrodes are successively stacked; and
   following relational expressions are satisfied:
   about $0.168 \leq$ Total thickness of inner electrodes/Dimension of multilayer body in stacking direction; and
   about $0.19 \leq$ Total number of first inner electrodes and second inner electrodes opposing each other with dielectric layers interposed therebetween/Total number of inner electrodes $\leq$ about $0.48$.

2. The multilayer ceramic capacitor according to claim 1, wherein
   at least one of following relational expressions is further satisfied:
   about $0.7 \leq$ Dimension of effective portion in length direction/Dimension of multilayer body in length direction $<$ about $1$; and
   about $0.7 \leq$ Dimension of effective portion in width direction/Dimension of multilayer body in width direction $<$ about $1$.

3. The multilayer ceramic capacitor according to claim 1, wherein
   the first inner electrodes are exposed at the first end surface of the multilayer body and electrically connected to the first outer electrode, and are exposed at the second end surface of the multilayer body and electrically connected to the second outer electrode; and
   the second inner electrodes are exposed at the first side surface of the multilayer body and electrically connected to the third outer electrode, and are exposed at the second side surface of the multilayer body and electrically connected to the fourth outer electrode.

4. The multilayer ceramic capacitor according to claim 1, wherein
- each of the second inner electrodes includes extended portions respectively electrically connected to the third outer electrode and the fourth outer electrode;
- each of the first inner electrodes includes extended portions respectively electrically connected to the first outer electrode and the second outer electrode; and
- the extended portions of each of the second inner electrodes are narrower in width than the extended portions of each of the first inner electrodes.

5. The multilayer ceramic capacitor according to claim 4, wherein a total distance between extended portions of the first inner electrodes is longer than a total distance between the extended portions of the second inner electrodes.

6. The multilayer ceramic capacitor according to claim 1, wherein the first outer layer portion and the second outer layer portion each have a total thickness of about 75 µm or more.

7. The multilayer ceramic capacitor according to claim 1, wherein a total number of the plurality of inner electrodes is about 100 or less.

8. The multilayer ceramic capacitor according to claim 1, wherein an average total thickness of the dielectric layers is about 0.6 µm or more and about 6 µm or less.

9. The multilayer ceramic capacitor according to claim 1, wherein the third outer electrode and the fourth outer electrode are wrapped around the multilayer body.

10. The multilayer ceramic capacitor according to claim 1, wherein an average total thickness of the plurality of inner electrodes is about 0.7 µm or more and about 1.5 µm or less.

11. The multilayer ceramic capacitor according to claim 1, wherein there is a greater total number of one of the first inner electrodes and the second inner electrodes than a total number of another one of the first inner electrodes and the second inner electrodes.

12. The multilayer ceramic capacitor according to claim 1, wherein the multilayer body further includes auxiliary electrodes provided on same planes as ones of the plurality of inner electrodes, and the auxiliary electrodes do not substantially contribute to generating an electrostatic capacitance.

13. The multilayer ceramic capacitor according to claim 1, wherein a total dimension of the multilayer body in the stacking direction is about 0.2 mm or more and about 2.5 mm or less, a total dimension of the multilayer body in the length direction is about 1.0 mm or more and about 3.2 mm or less, and a total dimension of the multilayer body in the width direction is about 0.5 mm or more and about 2.5 mm or less.

14. The multilayer ceramic capacitor according to claim 1, wherein the first inner electrode includes a first facing portion that extends between the first end surface and the first side surface of the multilayer body, a first extended portion that is extended to the first end surface to be electrically connected to the first outer electrode, and a second extended portion that is extended to the first side surface to be electrically connected to the second outer electrode; and
- the second inner electrode includes a second facing portion that extends between the second end surface and the second side surface of the multilayer body, a third extended portion that is extended to the second end surface to be electrically connected to the third outer electrode, and a fourth extended portion that is extended to the second side surface to be electrically connected to the fourth outer electrode.

* * * * *